United States Patent
Pham et al.

(10) Patent No.: US 8,205,309 B2
(45) Date of Patent: Jun. 26, 2012

(54) CLAMPS FOR SUPPORTING TRANSPORT SYSTEM STRUCTURES

(75) Inventors: Thi Nguyen Pham, Seattle, WA (US); David R. Gladish, Newcastle, WA (US); Thomas Edward Hansen, Seattle, WA (US); Alan D. Lagervall, Pacific, WA (US)

(73) Assignee: The Boeing Company, Chicago, IL (US)

( * ) Notice: Subject to any disclaimer, the term of this patent is extended or adjusted under 35 U.S.C. 154(b) by 731 days.

(21) Appl. No.: 12/329,915

(22) Filed: Dec. 8, 2008

(65) Prior Publication Data
US 2010/0139055 A1    Jun. 10, 2010

(51) Int. Cl.
*A44B 21/00* (2006.01)
*B60R 99/00* (2009.01)
(52) U.S. Cl. ........... 24/487; 248/74.1; 248/74.2; 248/63
(58) Field of Classification Search ............... 24/487, 24/457, 522, 527, 532, 570.09, 580.1, 580.11, 24/581.11, 572.1, 295; 248/74.1, 74.4, 68.1, 248/74.2, 74.3, 53, 63, 62
See application file for complete search history.

(56) References Cited

U.S. PATENT DOCUMENTS

| | | | | |
|---|---|---|---|---|
| 3,907,017 | A * | 9/1975 | Stanwick | 411/311 |
| 5,680,680 | A * | 10/1997 | LaConte | 24/295 |
| 6,164,604 | A * | 12/2000 | Cirino et al. | 248/74.3 |
| 6,234,277 | B1 * | 5/2001 | Kaczmarek | 187/414 |
| 6,512,875 | B1 * | 1/2003 | Johnson et al. | 385/134 |
| 6,517,032 | B1 * | 2/2003 | Gretz | 248/69 |
| 6,581,884 | B1 * | 6/2003 | Gretz | 248/74.1 |
| 6,631,876 | B1 * | 10/2003 | Phillips | 248/74.2 |
| 7,060,901 | B2 * | 6/2006 | Herzog et al. | 174/66 |
| 7,258,519 | B2 * | 8/2007 | Shimizu | 411/433 |

OTHER PUBLICATIONS

Nylon Molding Coropration / Div. of NMC Group, Inc.; Ring Posts; http://www.esterline.com/Portals/8/NMC/PDF/ringposts_07.pdf Printed Feb. 7, 2012.
Nylon Molding Coropration / Div. of NMC Group, Inc.; Stringer Clips; http://www.esterline.com/Portals/8/NMC/PDF/stringer_clips.pdf Printed Feb. 7, 2012.
Cooper Interconnect (Viking Electronics); SNAP-TRACK; http://www.cooperindustries.com/content/dam/public/wiringdevices/interconnect/Products/documents/brochures/snap_track_new_datasheet1.pdf Printed Feb. 7, 2012.

* cited by examiner

*Primary Examiner* — Robert J Sandy
*Assistant Examiner* — Rowland D Do
(74) *Attorney, Agent, or Firm* — Hope Baldauff Hartman, LLC

(57) ABSTRACT

Apparatus and methods are provided for supporting one or more structural members for installation onto a vehicle structure. A clamp may include two or more curved portions joined by a living hinge. The living hinge may enable the curved portions to pivot relative to one another, providing the clamp with an open position and a closed position. The curved portions may include respective track portions, with the first and second track portions being approximately collinear when the clamp is in the closed position. An elongated rigid latch defines an elongated channel for receiving these respective track portions to provide a rigid structural link between the first and second curved portions. A mounting point is attached to the first or the second curved portion, with the mounting point being adapted to receive the structural members.

18 Claims, 2 Drawing Sheets

CLAMPS FOR SUPPORTING TRANSPORT SYSTEM STRUCTURES

FIELD OF THE DISCLOSURE

This disclosure related generally to manufacturing and maintaining vehicles, such as aircraft. This disclosure relates more specifically to improved clamps for installation within those vehicles, with these clamps supporting structural members.

BACKGROUND

Certain types of vehicles may contain a variety of elongated structural members that run along portions of a framework or other structure within the vehicles. In some scenarios, for example when manufacturing or maintaining these vehicles, it may be appropriate to secure these structural members to nearby structure within the vehicles.

In some cases, the vehicle structure may include an insulation blanket. Previous techniques for securing structural members to vehicle structure typically involved installation of two or more separate devices. For example, an insulation blanket retainer may be installed to the vehicle structure, and afterwards a wire support device may be attached to the retainer. While these previous techniques may be sufficient to secure the structural members to the vehicle structure, opportunities to simplify and improve these installations nevertheless exist. For example, these previous two-part devices may involve additional labor time and cost during manufacture and maintenance operations, as compared to a one-part device. In addition, workers who are assembling and installing these two-part devices repetitively over time may experience ergonomic difficulties.

In addition, these previous two-part devices may damage the insulation blanket of the aircraft during installation. Any damage to the insulation blanket may result in water pooling and condensation near this damage. This pooled water may flow within the vehicles, possibly damaging sensitive electronic components.

These two-part devices may also include fasteners that secure the two parts together, with these fasteners contributing to the overall weight of the vehicle. However, a one-part device may eliminate the weight of these fasteners, thereby reducing overall vehicle weight.

SUMMARY

It should be appreciated that this Summary is provided to introduce a selection of concepts in a simplified form that are further described below in the Detailed Description. This Summary is not intended to be used to limit the scope of the claimed subject matter.

This description provides clamps for supporting one or more structural members for installation onto a vehicle structure. The clamps may include two or more curved portions joined by a living hinge. The living hinge may enable the curved portions to pivot relative to one another, providing the clamp with an open position and a closed position. The curved portions may include respective track portions, with the first and second track portions being approximately collinear when the clamp is in the closed position. An elongated rigid latch defines an elongated channel for receiving these respective track portions to provide a rigid structural link between the first and second curved portions. A mounting point is attached to the first or the second curved portion, with the mounting point being adapted to receive the structural members.

This description also provides methods for installing the clamps to vehicle structure to support the structural members. These methods may include providing a clamp having the first and second curved portions, with the living hinge joining the curved portions. The first and second curved portions pivot relative to one another, to provide the clamp with an open position and a closed position. The first and second curved portions include respective track portions. The clamp may be configured into the open position, and at least a portion of the vehicle structure passed between opposing ends of the first and second curved portions. The clamp is then configured into the closed position, so that the track portions are collinear. A rigid elongated latch is then slid into engagement with both of the track portions. At least one of the structural members may be engaged to a mounting point provided by the clamp.

The features, functions, and advantages discussed herein may be achieved independently in various embodiments of the present description or may be combined in yet other embodiments, further details of which can be seen with reference to the following description and drawings.

BRIEF DESCRIPTION OF THE DRAWINGS

FIG. 4 is a diagram illustrating an example of a locking mechanism incorporated into the clamp, as viewed along a line A-A as shown in FIG. 1.

FIG. 5 is a diagram illustrating another example of a locking mechanism for the clamp, as viewed along a line A-A as shown in FIG. 1.

DETAILED DESCRIPTION

The following detailed description discloses various tools and techniques related to clamps for supporting structural structures. This description is most readily understood with reference to the attached drawings, in which like reference numbers may appear in different drawings to refer to similar elements.

Figure 1:
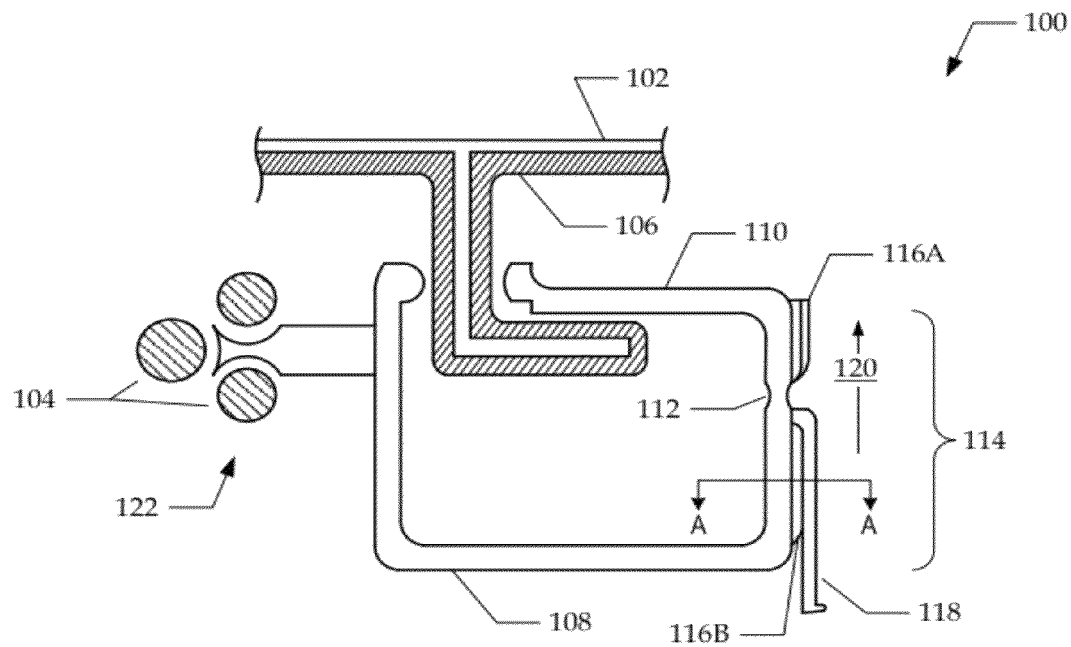
FIG. 1 is a diagram illustrating an example clamp installed around illustrative vehicle structure to support structural members.

FIG. 1 illustrates examples of clamps, denoted generally at 100, installed around illustrative vehicle structure 102, to support any number of structural members 104. The vehicle structure 102 may include, for example, portions of a framework associated with a vehicle or other transport system. Examples of the vehicles may include aircraft, ship, automobile, or the like. Examples of the vehicle structure 102 may include brackets, extended flanges, or other structure to which the structural members 104 may be attached. Examples of the structural members 104 may include conductors, whether considered individually or as combined into cables. Other examples of the structural members 104 may include hydraulic lines, pneumatic lines, tubing related to HVAC systems, plumbing, or the like, as appropriate in different types of vehicles. In some cases, the structural members 104 may be tubular, while in other cases, the structural members 104 may be non-tubular.

In some applications, the vehicle structure 102 may be provided with an insulating blanket 106, with this insulating blanket generally representing installation of any thickness, type, facing, or construction, as appropriate in different implementations scenarios. In such applications, the insulating blanket 106 may reduce heat transfer and/or provide a vapor barrier between different environments. In the example shown in FIG. 1, the clamp 100 may be installed around the structure 102, such that the insulating blanket 106 is not ruptured or damaged and continues to provide specified insulating properties despite the installation of the clamp 100.

Turning to the clamp 100 in more detail, it may be arranged in a generally ring-shaped configuration, which includes a first curved portion 108 and at least a second curved portion 110. The curved portions 108 and 110 may form an open, C-shaped configuration.

A living hinge 112 may join the first curved portion 108 with the second curved portion 110, such that the clamp 100 as a whole may flex at the living hinge mechanism 112. In this manner, the clamp 100 may operate in a closed position as shown in FIG. 1, or in a relatively open position as shown in FIG. 2 (described in more detail below).

The clamp 100 may also include a locking mechanism, denoted generally at 114. The locking mechanism 114 may include an elongated track 116a provided by the curved portion 110, and another elongated track 116b provided by the curved portion 108. When the clamp 100 is in the closed position, as shown in FIG. 1, the track portions 116a and 116b (collectively, track portions 116) may be arranged in a co-linear configuration, such that a rigid, elongated latch 118 may slide along the track portion 116b, in the direction indicated by the arrow 120. As the elongated latch 118 travels along the track portion 116b toward the track portion 116a, the latch 118 engages the track portion 116a, providing a rigid structural link between the curved portions 108 and 110. This rigid structural link reduces the possibility of the curved portions 108 and 110 rotating about the living hinge mechanism 112, and tends to engage the clamp 100 on the vehicle structure 102.

The clamp 100 may also include any number of mounting points 122, to which any number of the structural members 104 may be affixed. In the example shown, three structural members 104 are affixed to a given mounting point 122. However, the clamp 100 may include one or more of the mounting points 122, with individual mounting points 122 supporting attachment of any number of the structural members 104.

Figure 2:
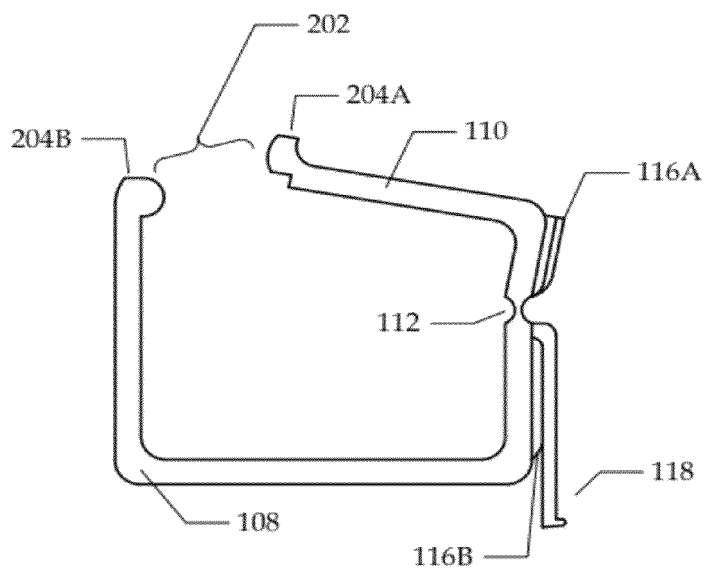
FIG. 2 is a diagram of the clamp as shown in FIG. 1, in an open configuration.

Turning now to FIG. 2, this Figure illustrates the clamp 100 arranged in an open configuration. As shown in FIG. 2, the latch 118 is in a withdrawn position, engaging the track portion 116b but not the track portion 116a. With the latch 118 in this withdrawn position, the curved portion 108 and the curved portion 110 are free to hinge relative to one another, via the living hinge 112. Accordingly, the curved portions 108 and 110 may be opened to define an open gap 202 between opposing ends 204a and 204b (collectively, opposing ends 204) provided respectively by the curved portions 108 and 110. When the clamp 100 is installed onto the vehicle structure 102, at least a portion of the vehicle structure may pass through the open gap 202 so defined by the clamp 100.

Turning to the opposing ends 204 in more detail, as shown in several of the figures, some implementations of the opposing ends 204 may be manufactured with a rounded configuration with no sharp edges. These implementations may be particularly suitable when the insulating blanket 106 includes a vapor barrier that is susceptible to puncture or other damage. In these scenarios, the rounded configuration of the opposing ends 204 may reduce the possibility of the clamp 100 puncturing, tearing, or otherwise damaging the vapor barrier. In this manner, the clamp 100 may reduce the risk of moisture collecting or pooling along the vehicle structure 102 in places where the clamp 100 is installed.

Figure 3:
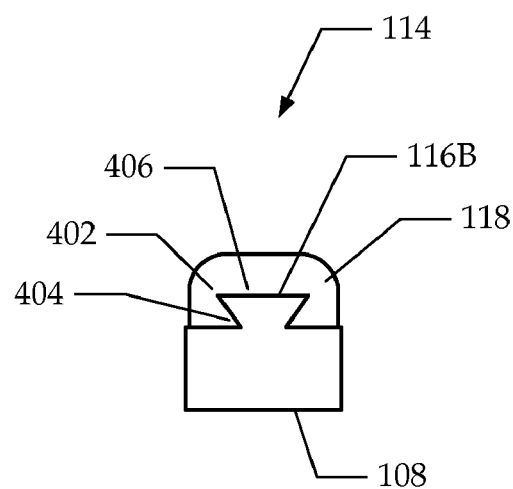
FIG. 3 is a diagram of the clamp in a closed or locked configuration.
Figure 3:
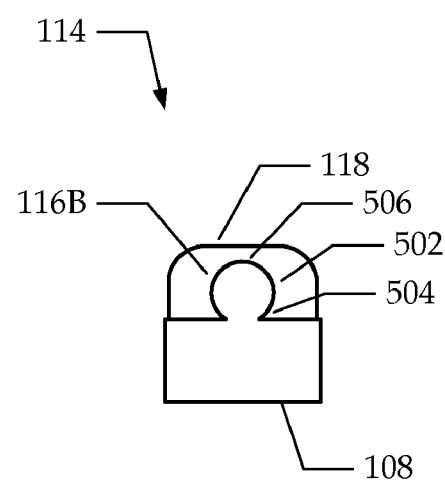
Figure 3:
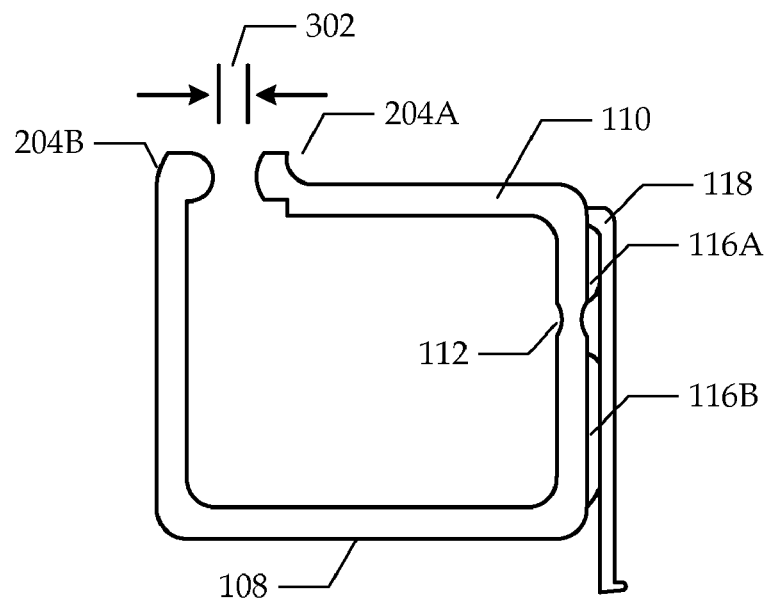

FIG. 3 illustrates the clamp 100 in a closed or locked configuration, with the latch 118 engaging both of the track portions 116a and 116b. In this closed or locked configuration, the rigid latch 118 locks the curved portions 108 and 110 into position relative to one another, such that the curved portions 108 and 110 do not pivot along the hinge 112. With the latch 118 in the closed configuration, the clamp 100 may define a closed gap 302 having a distance or width as indicated between the opposing ends 204a and 204b. This closed gap 302 may be chosen as appropriate in different implementations, depending on the dimensions of the vehicle structure 102 to which the clamp is to be installed. For example, the closed gap 302 may be chosen to account for factors such as the thickness of a flange provided by the vehicle structure 102, a thickness of any insulating blanket 106, and the like. Accordingly, it is noted that FIG. 3, as well as the other drawings provided herein, are not drawn to scale. Further, the sizes and proportions shown in these figures are chosen only for convenience of illustration, but not to limit possible implementations of this description.

FIG. 4 illustrates examples of the locking mechanism 114 as incorporated into the clamp 100, viewed along the line A-A shown in FIG. 1. However, the location of the line A-A is chosen somewhat arbitrarily in FIG. 1, and the descriptions of FIGS. 4 and 5 may apply generally, regardless of where the line A-A is visualized along the locking mechanism 114.

Turning to FIG. 4, the locking mechanism 114 may include the track portion 116b, which in turn may include a ridge or other suitable structure extending from the surface of the curved portion 108. As shown in more detail in FIG. 4, the track portion 116b may have a generally V-shaped configuration, such that an upper portion 402 is relatively wider than a lower portion 404.

The locking mechanism 114 may also include the latch 118. Turning to the latch 118 in more detail, it may define an elongated channel 406 having dimensions corresponding to the configuration of the track portion 116b. In general, the channel 406 of the latch 118 may snugly receive the track portion 116, such that some degree of friction occurs between the latch 118 and the track portion 116.

FIG. 5 illustrates other examples of the locking mechanism 114 for the clamp 100, also viewed along the line A-A in FIG. 1. In the example shown in FIG. 5, the curved portion 108 may include a track portion 116b, with FIG. 5 illustrating a track portion 116b having a generally rounded profile or configuration, such that a portion 502 is wider than a second portion 504, resulting in a ball-and-socket fit between the track portion 116b and the latch 118. In this scenario, the latch 118 may define an elongated channel 506 that corresponds to the rounded profile of the track portion 116b.

Generalizing from the examples shown in FIGS. 4 and 5, the track portions 116 and the elongated channels defined by the latches 118 may be configured to mate with one another, such that the latches 118 may slide onto the track portions 116. The track portions 116 may be configured with wider sections (e.g., 402 and 502) and narrower sections (e.g., 404 and 504), such that once the latches 118 are slid onto the track portions 116, the wider sections of the track portions 116 may secure the latches 118. Thus, the examples of the track portions 116 as shown in FIGS. 4 and 5, featuring respectively V-shaped or wedge-shaped profiles and rounded profiles, are understood to be illustrative and do not limit possible implementations.

The clamps 100 may be manufactured from any suitable materials. More specifically, the clamps 100 may be manufactured from resilient materials, sufficiently flexible to permit operation of the living hinge 112, for example. Suitable materials may include plastics or other polymeric materials, chosen as appropriate for particular implementations within the vehicle structures 102. For example, if the clamps 100 are to be installed within aircraft, the materials for manufacturing the clamps 100 may be selected based on factors relevant to the aviation industry. Examples of these factors may include resistance to smoke or other chemical contaminants, resistance to wide variations in temperature and/or pressure, or other similar factors. The same considerations apply to selecting the materials for constructing the mounting points 122 and the latch 118.

Turning to the mounting points 122 in more detail, they may be molded to be integral with the rest of the clamp 100, such that the clamp 100 and the mounting points 122 may be installed as one assembly. In contrast, previous techniques may involve installing a blanket clip to the vehicle structure 102, and then installing a separate ring post to the blanket clip in a second installation step.

The clamps 100 may be installed onto the vehicle structure 102 by first manipulating a given clamp 100 into the open configuration (e.g., as shown in FIG. 2), sliding the latch 118 into the withdrawn position as appropriate (e.g., as shown in FIGS. 1 and 2). Afterwards, the open clamp 100 may be passed over at least a portion of the vehicle structure 102, such that this portion of the vehicle structure is within the ring-shaped configuration of the clamp. The clamp 100 may then be manipulated to the closed position, by bringing the opposing ends 204 of the clamp closer to one another, until the track portions 116a and 116b are approximately collinear. At this point, the latch 118 may be slid from the track portion 116b into engagement with the track portion 116a, providing a rigid structural link between the curved portions 108 and 110 and locking the clamp 100 onto the vehicle structure 102. The structural members 104 may then be affixed to the mounting points 122, as appropriate.

The clamp 100 may be removed from the vehicle structure 102 by reversing the above installation process. More specifically, any structural members 104 affixed to the mounting points 122 may be removed, the latch 118 withdrawn from the track portion 116a, thereby freeing the clamp 100 to pivot around the living hinge 112. At this point, the opposing ends to a floor of the curved portions 108 and 110 may be separated from one another, and the clamp 100 removed from the vehicle structure 102.

As compared to previous approaches, the clamps 100 described herein may offer labor savings, because the clamps 100 may integrate the curved portions 108 and 110 (for contacting the vehicle structure 102) with the mounting points 122 (for supporting the structural members 104). In some previous approaches, blanket clips and ring posts were provided as separate elements, and were assembled and installed separately. In addition, previous clamps may have also included metallic fasteners. In contrast, the clamps 100 may be manufactured from plastic or polymeric materials, thereby achieving weight reduction, particularly when considering that a complex vehicle (e.g., aircraft) may incorporate dozens or hundreds of the clamps 100.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A clamp configured to support at least one structural member for installation on to a vehicle structure, the clamp comprising:
   a first curved portion and at least a second curved portion;
   a living hinge joining the first curved portion to the second curved portion, wherein the first and second curved portions pivot relative to one another, defining an open position and a closed position;
   wherein the first curved portion includes a first track portion projecting from an exterior surface of the first curved portion and extending linearly away from the living hinge and wherein the second curved portion includes a second track portion projecting from an exterior surface of the second curved portion and extending linearly away from the living hinge in a direction opposite the first track portion, wherein the first and second track portions are approximately collinear when the clamp is in the closed position;
   an elongated rigid latch defining an elongated channel configured to slidably receive the first and second track portions and secure the clamp in the closed position; and
   at least one mounting point attached to the first curved portion or the second curved portion, wherein the mounting point is configured to receive the at least one structural member.

2. The clamp of claim 1, wherein the first curved portion and the second curved portion provide a generally ring-shaped configuration.

3. The clamp of claim 1, wherein the first curved portion and the second curved portion provide a generally C-shaped configuration.

4. The clamp of claim 1, further comprising at least a further mounting point attached to the first curved portion or the second curved portion, wherein the further mounting point is adapted to receive at least a further structural member.

5. The clamp of claim 1, wherein the mounting point is adapted to receive at least a further structural member.

6. The clamp of claim 1, wherein the first and second track portions have a generally V-shaped profile.

7. The clamp of claim 1, wherein the first and second track portions have a generally rounded profile.

8. The clamp of claim 1, wherein the first and second curved portions include respective opposing ends that define a gap for receiving the vehicle structure.

9. The clamp of claim 8, wherein the opposing ends have rounded configurations.

10. The clamp of claim 1, wherein the mounting point is integral with the first curved portion or the second curved portion.

11. The clamp of claim 1, wherein the clamp is manufactured from a polymeric material.

12. A vehicle structure with the clamp of claim 1 installed therein.

13. A method of installing a clamp to vehicle structure for supporting at least one structural member, the method comprising:
   providing a clamp having a first curved portion and at least a second curved portion, a living hinge joining the first curved portion to the second curved portion, wherein the first and second curved portions pivot relative to one another, defining an open position and a closed position, wherein the first curved portion comprises a first track portion projecting from an exterior surface of the first curved portion and extending linearly away from the living hinge, and wherein the second curved portion comprises a second track portion projecting from an exterior surface of the second curved portion and extending linearly away from the living hinge;

configuring the clamp into the open position;

passing at least a portion of the vehicle structure between opposing ends of the first and second curved portions of the clamp when the clamp is in the open position;

configuring the clamp into the closed position, so that the first and second track portions are collinear;

sliding a rigid elongated latch into engagement with both of the first and second track portions; and engaging the at least one structural member to a mounting point provided by the clamp.

14. The method of claim 13, further comprising engaging at least a further structural member to the mounting point.

15. The method of claim 13, further comprising engaging at least a further structural member to a further mounting point divided by the clamp.

16. The method of claim 13, wherein configuring the clamp into the open position includes pivoting the curved portions relative to one another at the living hinge.

17. The method of claim 13, further comprising removing the clamp from the vehicle structure.

18. The method of claim 17, wherein removing the clamp includes sliding the latch out of engagement with one of the track portions, pivoting the first and second curved portions to open the clamp, and removing the clamp from the vehicle structure.

* * * * *